United States Patent
Bunker et al.

(10) Patent No.: US 7,182,576 B2
(45) Date of Patent: Feb. 27, 2007

(54) HOT GAS PATH COMPONENT WITH MESH AND IMPINGEMENT COOLING

(75) Inventors: Ronald Scott Bunker, Niskayuna, NY (US); Ching-Pang Lee, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 286 days.

(21) Appl. No.: 10/881,506

(22) Filed: Jun. 29, 2004

(65) Prior Publication Data
US 2005/0118023 A1 Jun. 2, 2005

Related U.S. Application Data

(63) Continuation-in-part of application No. 10/720,045, filed on Nov. 19, 2003.

(51) Int. Cl.
*F01D 5/18* (2006.01)
(52) U.S. Cl. .................. 416/96 R; 29/889.2; 29/241 R
(58) Field of Classification Search .............. 416/96 R, 416/97 R, 241 R, 241 B; 29/889.2
See application file for complete search history.

(56) References Cited

U.S. PATENT DOCUMENTS

| | | | |
|---|---|---|---|
| 1,848,375 A | 3/1932 | Muir | |
| 2,938,333 A | 5/1960 | Wetzler | |
| 3,229,763 A | 1/1966 | Rosenbald | |
| 3,616,125 A * | 10/1971 | Bowling | 416/229 A |
| 3,664,928 A | 5/1972 | Roberts | |
| 3,899,882 A | 8/1975 | Parker | |
| 4,158,949 A | 6/1979 | Reider | |
| 4,184,326 A | 1/1980 | Pane, Jr. et al. | |
| 4,690,211 A | 9/1987 | Kuwahara et al. | |
| 4,838,031 A | 6/1989 | Cramer | |

(Continued)

FOREIGN PATENT DOCUMENTS

EP   1111190   6/2001

(Continued)

OTHER PUBLICATIONS

Patent Application, Ronald Scott Bunker et al, U.S. Appl. No. 10/462,755, filed Jun. 6, 2002.

(Continued)

*Primary Examiner*—Ninh H. Nguyen
(74) *Attorney, Agent, or Firm*—Penny A. Clarke; Patrick K. Patnode

(57) ABSTRACT

A component includes at least one wall having an inner portion and an outer portion. A number of pins extend between the inner and outer portions. The pins define a mesh cooling arrangement with a number of flow channels. The inner portion of the wall defines a number of dimples. A method for forming a number of cooling holes in a component is described. The component has at least one wall with inner and outer portions. The inner portion defines a number of dimples. The method includes centering a drilling tool on a dimple, drilling at least one impingement cooling hole through the inner portion of the wall at the dimple using the drilling tool, and repeating the centering and drilling steps for a number of dimples to drill a number of impingement cooling holes in the inner portion of the wall.

32 Claims, 6 Drawing Sheets

U.S. PATENT DOCUMENTS

| | | | |
|---|---|---|---|
| 5,353,865 | A | 10/1994 | Adiutori et al. |
| 5,361,828 | A | 11/1994 | Lee et al. |
| 5,370,499 | A | 12/1994 | Lee |
| 5,402,464 | A | 3/1995 | Schenk et al. |
| 5,421,158 | A | 6/1995 | Stenger et al. |
| 5,460,002 | A | 10/1995 | Correa |
| 5,577,555 | A | 11/1996 | Hisajima et al. |
| 5,651,662 | A | 7/1997 | Lee et al. |
| 5,660,525 | A | 8/1997 | Lee et al. |
| 5,681,144 | A | 10/1997 | Spring et al. |
| 5,690,472 | A | 11/1997 | Lee |
| 5,695,321 | A | 12/1997 | Kercher |
| 5,724,816 | A | 3/1998 | Ritter et al. |
| 5,738,493 | A | 4/1998 | Lee et al. |
| 5,758,503 | A | 6/1998 | DuBell et al. |
| 5,797,726 | A | 8/1998 | Lee |
| 5,822,853 | A | 10/1998 | Ritter et al. |
| 5,933,699 | A | 8/1999 | Ritter et al. |
| 5,975,850 | A | 11/1999 | Abuaf et al. |
| 6,098,397 | A | 8/2000 | Glezer et al. |
| 6,134,877 | A | 10/2000 | Alkabie |
| 6,190,120 | B1 | 2/2001 | Thatcher et al. |
| 6,237,344 | B1 | 5/2001 | Lee |
| 6,334,310 | B1 | 1/2002 | Sutcu et al. |
| 6,402,470 | B1 | 6/2002 | Kvasnak et al. |
| 6,408,629 | B1 | 6/2002 | Harris et al. |
| 6,412,268 | B1 | 7/2002 | Cromer et al. |
| 6,468,669 | B1 | 10/2002 | Hasz et al. |
| 6,494,044 | B1 | 12/2002 | Bland |
| 6,504,274 | B2 | 1/2003 | Bunker et al. |
| 6,526,756 | B2 | 3/2003 | Johnson et al. |
| 6,589,600 | B1 * | 7/2003 | Hasz et al. .................. 427/264 |
| 6,599,568 | B2 | 7/2003 | Lee et al. |
| 6,607,355 | B2 | 8/2003 | Cunha et al. |
| 6,617,003 | B1 | 9/2003 | Lee et al. |
| 2003/0086785 | A1 | 5/2003 | Bunker |
| 2003/0203259 | A1 | 10/2003 | Bunker |

FOREIGN PATENT DOCUMENTS

| | | |
|---|---|---|
| JP | 280390 | 12/1986 |
| JP | 8110012 | 4/1996 |
| JP | 217994 | 8/1997 |
| JP | 164701 A | 6/2001 |

OTHER PUBLICATIONS

Patent Application, Ronald Scott Bunker, U.S. Appl. No. 10/065,115, filed Sep. 18, 2002.

Patent Application, Ronald Scott Bunker, U.S. Appl. No. 10/064,605, filed Jul. 30, 2002.

Patent Application, Ronald Scott Bunker, U.S. Appl. No. 10/065,495, filed Oct. 24, 2002.

Patent Application, Ronald Scott Bunker et al., U.S. Appl. No. 10/162,756, filed Jun. 6, 2002.

Patent Applicaiton, Ronald Scott BUnker, U.S. Appl. No. 10/065,814, filed Nov. 22, 2002.

Patent Application, Ronald Scott Bunker, U.S. Appl. No. 10/301,672, filed Nov. 22, 2002.

Patent Application, Ronald Scott Bunker, U.S. Appl. No. 10/065,108, filed Sep. 18, 2002.

K. Takeishi et al., "Heat Transfer Characteristics of a Flow Passage With Long Pin Fins and Improving Heat Transfer Coefficient by Adding Turbulence Promoters on a Endwall," Paper No. 2001-GT-178, IGTI Turbo Expo, New Orleans, pp.

S. Anzai et al., "Effect of the Shape of Turbulence Promoter Ribs on Heat Transfer and Pressure Loss Characteristics", Bulletin of the Gas Turbine Society of Japan, 1992.

V. N. Afanas'yev et al., "Heat Transfer and Friction on Surfaces Contoured by Spherical Depressions," Heat Transfer Research, vol. 24, No. 1, 1992. pp. 24-105.

V. N. Afansyev et al., "Turbulent Flow Friction and Heat Transfer Characteristics for Spherical Cavities on a Flat Plate," Experimental Thermal and Fluid Science, 1993, vol. 7, pp. 1-8.

D. E. Metzger et al., "Developing Heat Transfer in Rectangular Ducts with Staggered Arrays of Short Pin Fins", Journal of Heat Transfer, vol. 104, Nov. 1982, pp. 100-706.

M. Ya Belen'kii et al., "Experimental Study of the Thermal and Hydraulic Characteristics of Heat-Transfer Surfaces Formed by Spherical Cavities," II. Polzunova Cent. Scientific Research, Translated from Teplofizika Vysokikh Temperatur, vol. 29, No. 6, 1992 Plenum Pub. Corp., pp. 928-933.

Belen-kiy et al., "Heat Transfer Augmentation Using Surfaces Formed by a System to Spherical Cavities," ISSN1064-2269/93/0002-0196, Heat Transfer Research, vol. 25, No. 2, 1993, pp. 196-203.

Kesarev et al., "Convective Heat Transfer in Turbulized Flow Past a Hemispherical Cavity," Heat Transfer Research, vol. 25, No. 2, 1993, pp. 156-160.

N. Syred et al., "Effect of Surface Curvature on Heat Transfer and Hydrodynamics within a Single Hemispherical Dimple," Paper No. 2000-GT-236, Proceedings of ASME Turboexpo 2000, May 8-11, 2000, Munich Germany, pp. 1-6.

H. K. Moon et al., "Channel Height Effect on Heat Transfer and Friction in a Dimpled Passage," IGTI Turbo Expo, Paper No. 99-GT-163, Indianapolis, pp. 1-8.

C. Carcasi et al., "Heat Transfer and Pressure Drop Evaluation in Thin Wedge-Shaped Trailing Edge," Paper No. GT-2003-38197, IGTI Turbo Expo, Jun. 16-19 Atlanta, Georgia, pp. 111-122.

M. K. Chyu et al., "Convective Heat Transfer of Cubic Fin Arrays in a Narrow Channel," Journal of Turbomachinery, Apr. 1998, vol. 120, pp. 362-367.

N. Zhang et al., "Heat Transfer and Friction Loss Performance in Flow Networks with Multiple Intersections," Experimental Heat Transfer, vol. 6, 1993. pp. 243-257.

V. N. Afanas'Yev et al., "Thermohydraulics of Flow Over Isolated Depressions (Pits, Grooves) in a Smooth Wall," Heat Transfer Research, ISSN 1064-2285/93/0001-0022, vol. 25, No. 1, 1993, pp. 22-56.

Ronald S. Bunker et al., "In-Wall Network (MESH) Cooling Augmentation of Gas Turbine Airfoils," ASME Turbo Expo 2004, Power for Land, Sea and Air, Jun. 14-17, 2004, Vienna, Austria, GT2004-54260, pp. 1-12.

\* cited by examiner

HOT GAS PATH COMPONENT WITH MESH AND IMPINGEMENT COOLING

CROSS REFERENCE TO RELATED APPLICATIONS

This application is a continuation in part of U.S. patent application Ser. No. 10/720,045, Nov. 19, 2003 R. S. Bunker et al., entitled "Hot Gas Path Component with Mesh and Dimpled Cooling," which is hereby incorporated by reference in its entirety.

STATEMENT REGARDING FEDERALLY SPONSORED RESEARCH & DEVELOPMENT

This invention was made with Government support under contract number PRDA VII F33615-02-C-2212 awarded by the DOD. The Government has certain rights in the invention.

BACKGROUND OF THE INVENTION

The invention relates generally to hot gas path components for turbine assemblies and, more particularly, to synergistic approaches to cool the hot gas path components.

Exemplary gas turbine engines are used for aircraft or stationary power applications, and engine efficiency is a key design criteria for both applications. The efficiency of gas turbine engines improves with increased temperature of the combustion gas flow. However, a limiting factor in the gas flow temperature is the high temperature capability of the various hot gas path components, such as the turbine stator and rotor airfoils. Stator airfoils are also known as vanes or nozzles, rotor airfoils are also known as blades or buckets.

Various approaches to cooling the hot gas path components have been proposed and implemented to increase the upper operating temperature of the engines. Several of these approaches are reviewed in commonly assigned U.S. Pat. No. 5,690,472, Lee, "Internal Cooling of Turbine Airfoil Wall Using Mesh Cooling Arrangement." These cooling techniques typically involve bleeding compressed air off the compressor to serve as a coolant. However, by bypassing the compressed air around the engine's combustion zone to cool the hot gas path components, the overall efficiency of the engine is reduced. Accordingly, it is desirable to increase the cooling effectiveness of the hot gas path components, in order to improve overall engine efficiency.

One beneficial cooling technique is mesh cooling, as described, for example in U.S. Pat. No. 5,690,472, which is cited above, and in U.S. Pat. No. 5,370,499, Lee, "Film Cooling of Turbine Airfoil Wall using Mesh Cooling Hole Arrangement." However, a need for additional improvement in cooling of hot gas path components remains. This need is especially strong for cooling thin airfoil walls and/or regions of limited accessibility, such as the trailing edges of airfoils. Accordingly, it would be desirable to provide enhanced cooling effectiveness for hot gas components.

BRIEF DESCRIPTION

Briefly, in accordance with one embodiment of the present invention, a component is described. The component includes at least one wall having an inner portion and an outer portion. A number of pins extend between the inner and outer portions of the wall. The pins define a mesh cooling arrangement having a number of flow channels. A number of dimples are located in the inner portion of the wall.

In accordance with another embodiment, a method for forming a number of cooling holes in a component is described. The component has at least one wall having an inner portion and an outer portion. The inner portion of the wall defines a number of dimples. The method includes centering a drilling tool on one of the dimples, drilling at least one impingement cooling hole through the inner portion of the wall at the dimple using the drilling tool, and repeating the centering and drilling steps for a number of dimples to drill a number of impingement cooling holes in the inner portion of the wall.

In accordance with another embodiment, a method for forming a number of cooling holes in a component includes centering a number of drilling tools on respective ones of the dimples and drilling a number of impingement cooling holes through the inner portion of the wall at the dimples using the drilling tools.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
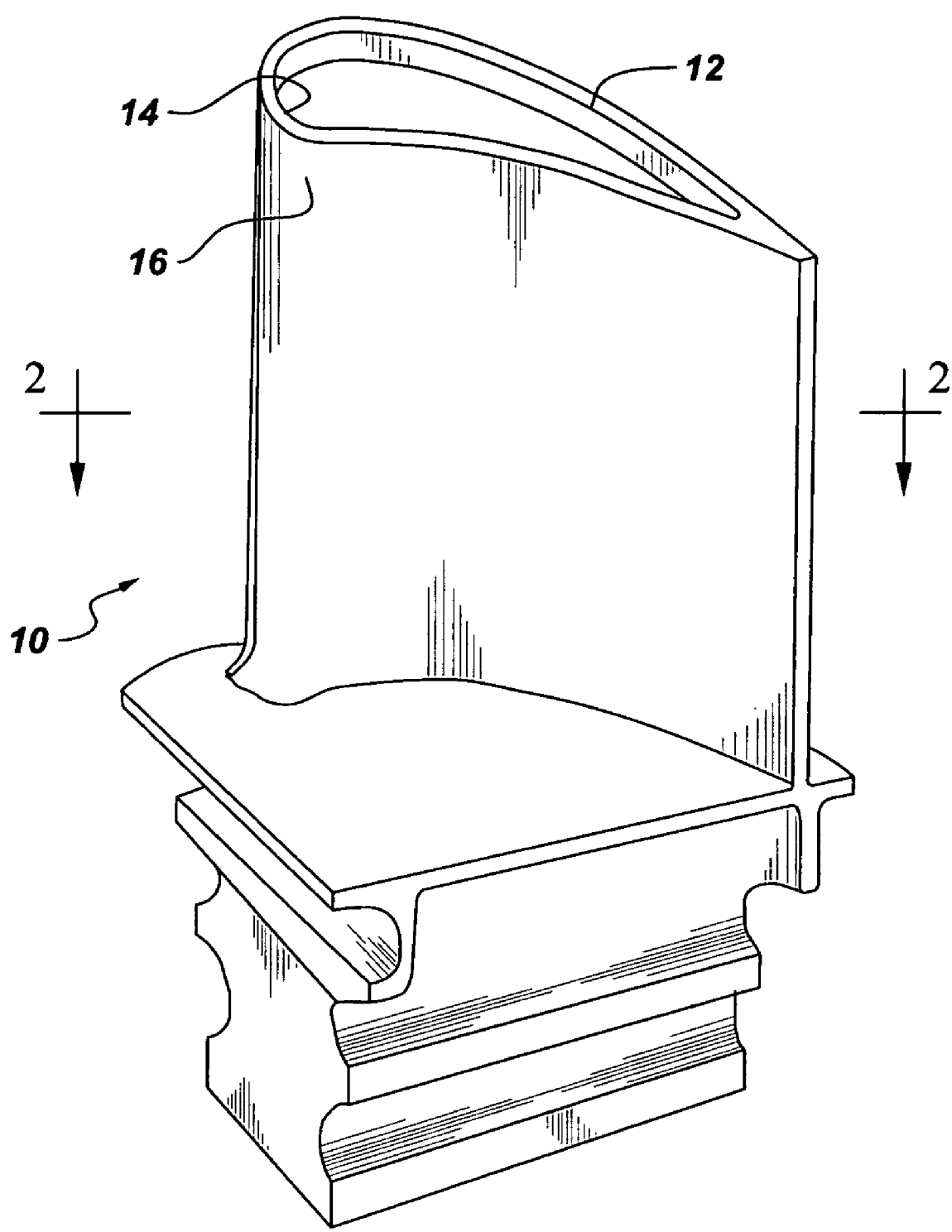
FIG. 1 shows an exemplary hot gas path component with an airfoil.
Figure 2:
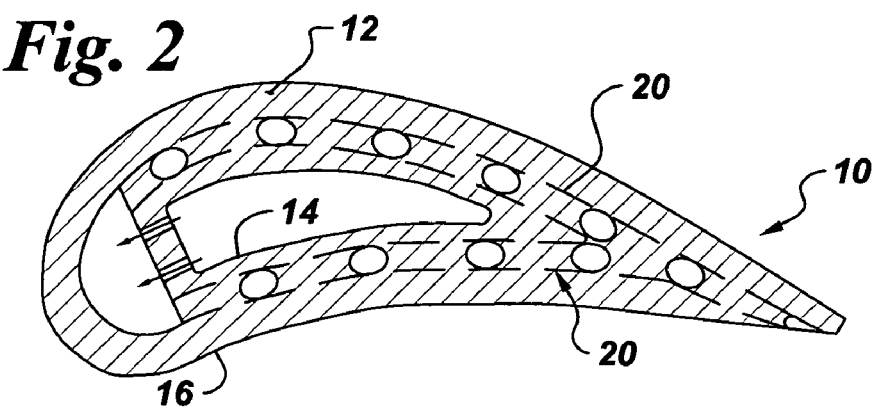
FIG. 2 is a cross-sectional view of the airfoil of FIG. 1, taken along line 2—2 of FIG. 1, and indicating a mesh cooling arrangement.

A component 10 embodiment of the invention is described with reference to FIGS. 1–4. Exemplary components include hot gas path components, such as blades, vanes, end walls, and shrouds. The invention is equally applicable to other portions of the stator and rotor assemblies, as well as to other hot sections such as after-burners. Moreover, the invention applies to various size and application gas turbines, such as aircraft engines and land-based power turbines. Conventional hot gas components are well known, as are mesh cooled hot gas path components. The component 10 shown is purely exemplary, and the invention is not limited to any particular component type. As shown, for example in FIGS. 1 and 2, the component 10 has at least one wall 12 having an inner portion 14 and an outer portion 16. For the exemplary embodiment of FIGS. 1 and 2, the wall 12 is an airfoil wall 12. As shown, for example in FIGS. 3 and 4, the component 10 further includes a number of pins 18 extending between the inner and outer portions 14, 16 of the wall 12. The pins define a mesh cooling arrangement 20 that includes a number of flow channels 22, as shown for example in FIG. 3. Exemplary pin shapes are rounded or sharp, depending on the manufacturing method. Exemplary pin shapes include cylindrical and rounded diamonds. The shape may be selected, in part, to obtain a more directional cooling flow, for example to enhance interaction with the other cooling enhancements, such as dimples or turbulators. Investment casting produces a rounded pin, whereas sharper corners result from fabrication methods. As shown for example in FIGS. 3 and 4, the inner portion 14 of the wall 12 defines a number of dimples 24.

Exemplary dimples 24 have a center depth of about 0.010 to about 0.030 inches and a surface diameter of about 0.010 to about 0.12 inches for typical aircraft engine applications. Exemplary dimples have a center depth of about 0.010 to about 0.060 inches and a surface diameter of about 0.010 to about 0.250 inches for typical power turbine applications. The dimples 24 may be formed in a number of shapes. For the exemplary embodiment of FIGS. 3 and 4, the dimples 24 are concave and, more particularly, are hemispherical or hemispherical sections. Another exemplary dimple shape is a cone shape, including both a full or a truncated inverted cone. Beneficially, the dimples 24 set up fluid vortices in the cooling flow, which causes mixing near the component wall 12 (near or on surfaces 14 and 16, and also surfaces of 18), thereby enhancing the heat transfer at the wall 12, as well as on the pin surfaces. In addition, the dimples 24 also increase surface area to help compensate for the area covered by the pins 18.

Figure 3:
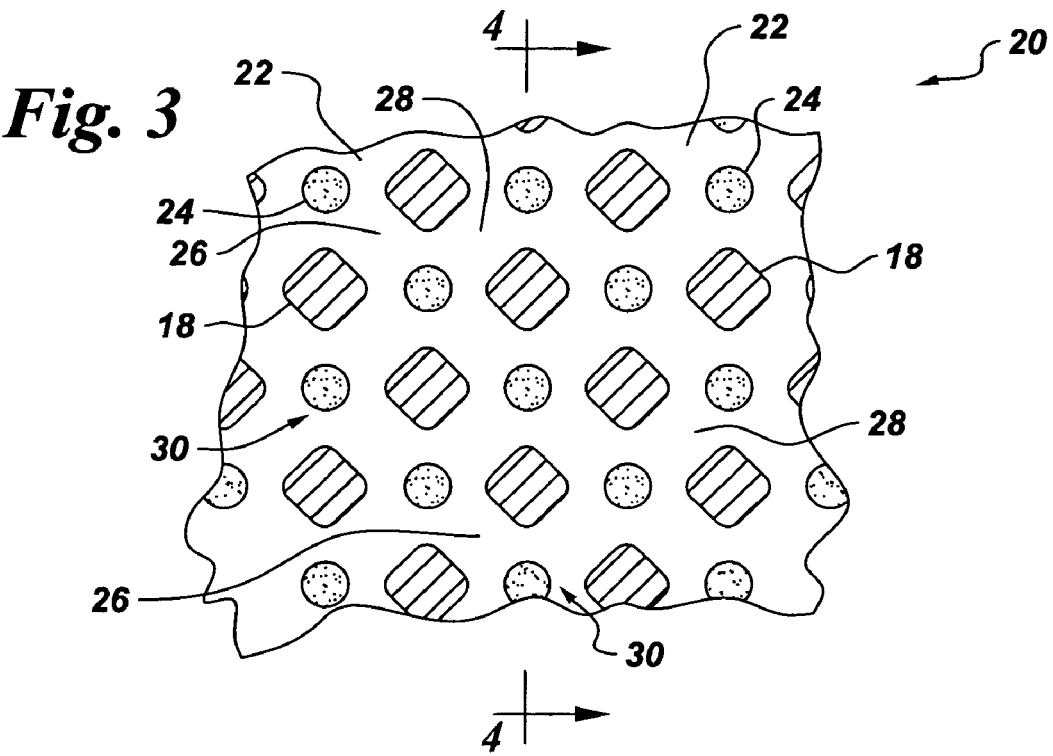
FIG. 3 is an enlarged longitudinal sectional view of an exemplary embodiment of the mesh cooling arrangement of FIG. 2 with a number of dimples arranged at respective intersection points.
Figure 4:
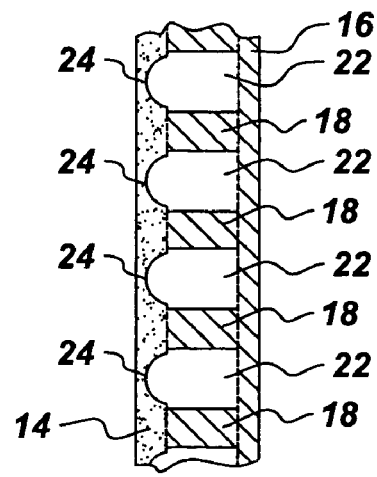
FIG. 4 is a longitudinal sectional view of the mesh cooling arrangement taken along line 4—4 of FIG. 3.

For the exemplary arrangement of FIG. 3, the flow channels 22 include a first set of flow channels 26 substantially parallel to one another and a second set of flow channels 28 extending substantially parallel to one another. As shown, the first and second sets of flow channels 26, 28 intersect one another at a number of intersection points 30 to form the mesh cooling arrangement 20. For the particular arrangement of FIG. 3, the dimples 24 are positioned at the intersection points 30. Beneficially, positioning the dimples 24 at the intersection points 30 within the mesh cooling arrangement 20 enhances both the cooling flow and the heat transfer. The dimples 24 provide a surface relief for expansion of the cooling flow. In addition, the dimples create additional vorticity, further enhancing the heat transfer. Because the vorticity preferentially exits at typically forty-five degree (45°) angles, it does not impact the apex of the solid portions of the mesh, thereby keeping losses low. Although not expressly shown, for smaller sized dimples 24, arrays or rows or other arrangements of dimples 24 may be situated at the intersection points 30.

Figure 5:
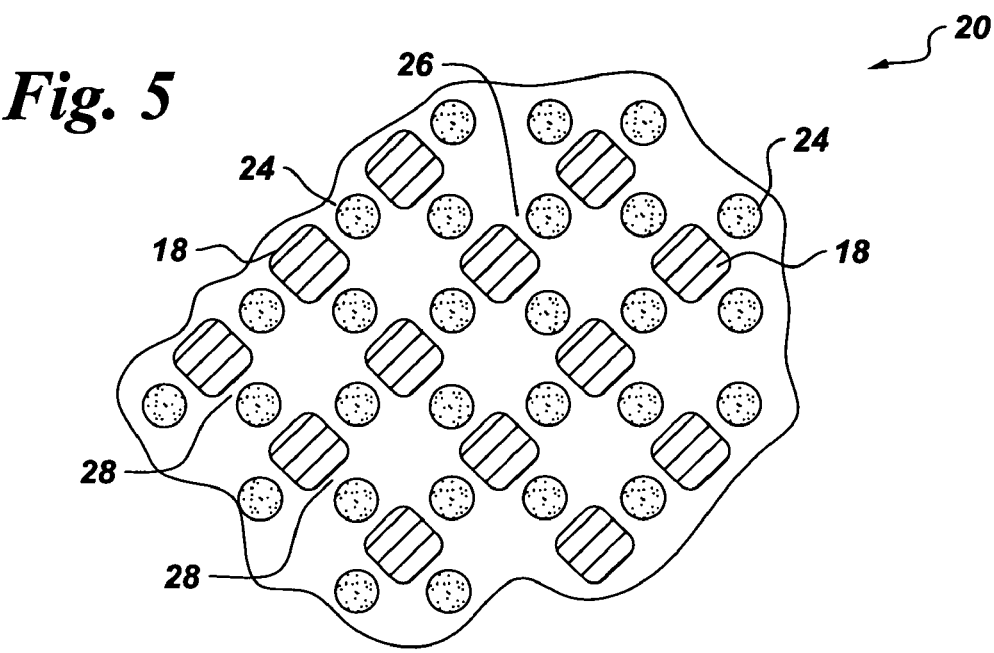
FIG. 5 is an enlarged longitudinal sectional view of another exemplary embodiment of the mesh cooling arrangement of FIG. 2 with a number of dimples arranged between respective pairs of pins.

For the exemplary embodiment of FIG. 5, the dimples 24 are positioned between respective pairs of pins 18. In other words, the dimples 24 are located in the "channel portions" of the mesh cooling arrangement 20, instead of the intersection points 30. Beneficially, positioning the dimples 24 in the channel portions, as shown for example in FIG. 5, enhances post-interaction flow, thereby evening out the creation of vorticity and enhancing heat transfer throughout the mesh.

Figure 6:
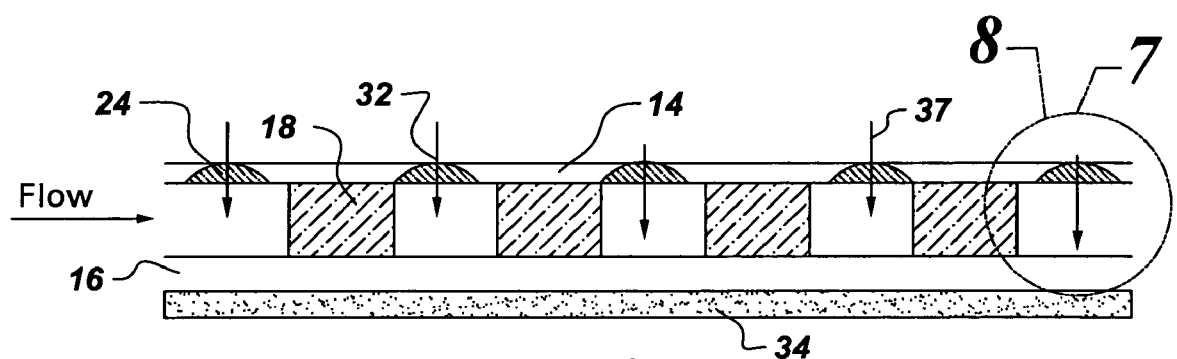
FIG. 6 illustrates an impingement cooling embodiment of the mesh cooling and dimple arrangement.
Figure 7:
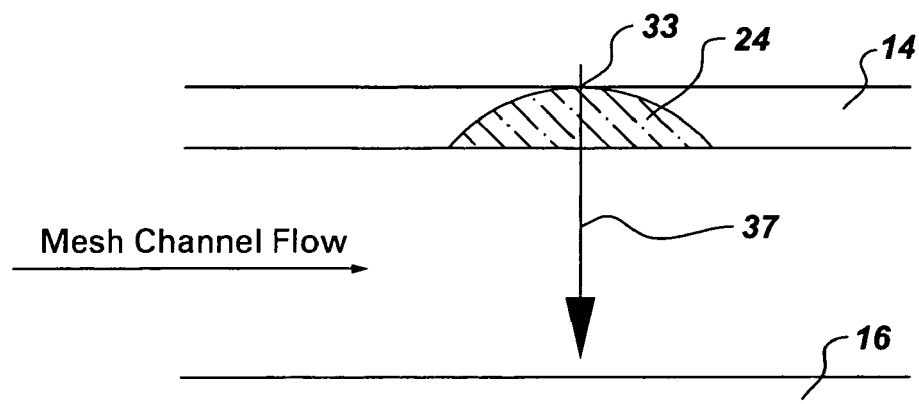
FIG. 7 illustrates strong impingement through a cooling hole formed where a dimple breaks through the cold wall.
Figure 8:
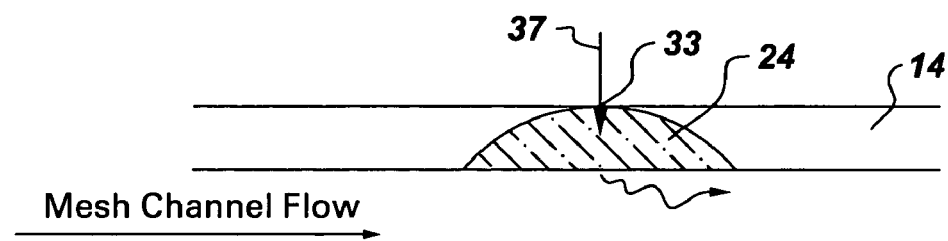
FIG. 8 shows interactions between the dimple and an impingement jet.

An impingement cooling embodiment is described with reference to FIGS. 6–8. As shown in FIG. 6, the dimples 24 are located in the inner portion 14 of the wall 12 and at least one of the dimples 24 extends through the inner portion 14 of the wall 12 to form an impingement cooling hole 33. For the exemplary embodiment of FIG. 6, each of the dimples 24 shown extends through the inner portion 14 of the wall 12 to form respective impingement cooling holes 33. However, for other embodiments at least one of the dimples 24 does not extend through the inner portion 14 of the wall 12. Beneficially, by extending through the inner portion 14 of the wall 12 to form impingement cooling holes 33, impingement jets 37 (indicated by the arrows) are generated. As indicated, the impingement jets 37 are directed from inner portion 14, which is the "cold wall" (interior), toward outer portion 16, which is the "hot wall" (or gas side). This impingement cooling generates high convective heat transfer coefficients, enhancing cooling of outer portion 16. An example of strong impingement is illustrated in FIG. 7. As indicated, strong impingement penetrates to give high heat transfer on the outer portion 16 ("hot wall") surface. In addition, interactions between a dimple 24 and the corresponding jet 37 create higher enhancements via bulk mixing and turbulence, as indicated in FIG. 8.

Figure 9:
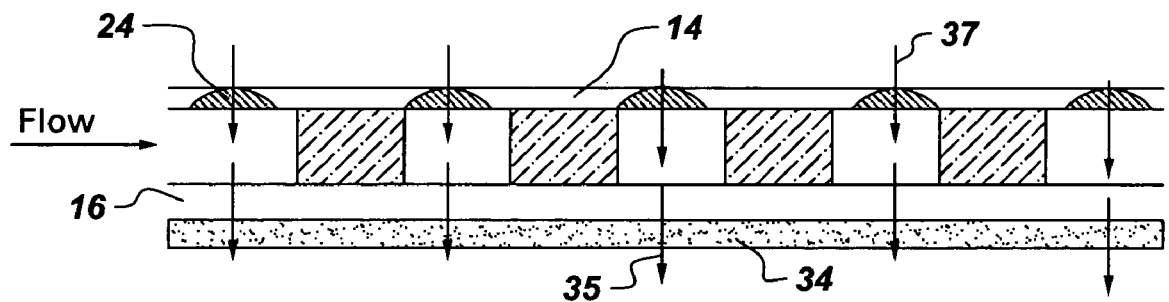
FIG. 9 illustrates a mesh cooling and dimple arrangement with impingement and transpiration cooling.

An impingement and transpiration cooling embodiment is described with reference to FIG. 9. As shown, the outer portion 16 of the wall 12 defines a number of cooling holes 35. For the exemplary embodiment of FIG. 9, each of the cooling holes 35 is aligned with a respective one of the dimples 24. For other embodiments, the cooling holes 35 and dimples 24 are not aligned. Exemplary cooling holes 35 for aircraft engine applications have a diameter in a range of about 0.004 to about 0.035 inches. For stationary power generation applications, exemplary cooling holes have a diameter in a range of about 0.004 to 0.060 inches. Power turbines can use the full range in this case. Beneficially, the cooling holes 35 provide transpiration cooling for the hot wall 16. As exemplarily shown in FIG. 9, the impingement jets 37 supply the cooling holes 35 with cooler flows from the cold wall 14.

Figure 10:
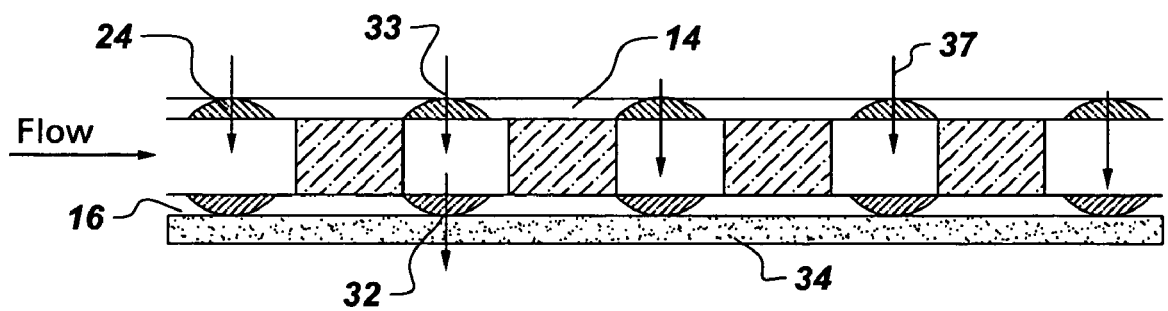
FIG. 10 illustrates another mesh cooling and dimple arrangement with impingement and transpiration cooling.

Another impingement and transpiration cooling embodiment is described with reference to FIG. 10. As shown, dimples 24 are located in both the inner and outer portions 14, 16 of the wall 12. At least one of the dimples 24 extends through the inner portion 14 of the wall 12 to form an impingement cooling hole 33. For the exemplary embodiment of FIG. 10, each of the dimples 24 shown extends through the inner portion 14 of the wall 12 to form respective impingement cooling holes 33. As noted above, by extending through the inner portion 14 of the wall 12 to form impingement cooling holes 33, impingement jets 37 (indicated by the arrows) are generated. For the exemplary embodiment of FIG. 10, at least one coating 34 is disposed on the outer portion 16 of wall 12. An exemplary coating 34 is a thermal barrier coating. To feed cooling flow to the surface of the outer portion 16 of the wall 12, at least one of the dimples 24 extends through the outer portion 16 of wall 12 to form a transpiration cooling hole 32, and the coating 34 at least partially covers the transpiration cooling hole 32. For a particular embodiment, each of the dimples 24 extends through the outer portion 16 of the wall 12 to form respective transpiration cooling holes 32, and each of the transpiration cooling holes 32 shown is covered by the coating layer 34. Beneficially, by extending through the outer portion 16 of the wall 12, the dimples 24 provide film cooling for the component wall 12. More particularly, the dimples 24 that extend through the outer portion 16 of the wall to form transpiration cooling holes 32 provide transpiration cooling, whereas any dimples 24 that do not extend through the outer portion of the wall provide ventilation to help cool the component wall 12. Ventilation of the wall is the augmentation of the surface with non-penetrating holes such that coolant may circulate within the additional area to provide cooling without the release of film or transpiration cooling.

Depending on the desired level of cooling and specific component characteristics, dimples 24 can be formed of varying depth and/or diameter, such that some, all or none of the dimples 24 extend through the respective inner and outer portions 14, 16 of the component wall 12. Where the dimples 24 extend through the inner portion 14 of the wall 12, they form impingement cooling holes 33, providing impingement cooling for the component wall 12, as indicated by arrows 37 in FIG. 10. Where the dimples 24 extend through the outer portion 16 of the wall 12, they form transpiration cooling holes 32, providing transpiration cooling for the component wall 12, as indicated by arrows in FIG. 10. Where the dimples 24 do not extend through the outer portion 16 of the wall 12, they provide ventilation to help cool the component wall 12.

A method embodiment of the invention for forming cooling holes 33 in a component 10 is described with reference to FIGS. 11 and 12. The component 10 has at least one wall 12 with an inner portion 14 and an outer portion 16, and the inner portion 14 of the wall defines a number of dimples 24. Exemplary components 10 include hot gas path components 10, such as turbine blades 10. The method includes centering a drilling tool 100 on one of the dimples 24, drilling at least one impingement cooling hole 33 through the inner portion 14 of the wall 16 at the dimple 24 using the drilling tool 100, and repeating the centering and drilling steps for a number of the dimples 24 to drill a number of impingement cooling holes 33 in the inner portion 14 of the wall 12. This method is equally applicable if the holes are not centered perfectly, or if the holes are at some shallow angle to the perpendicular shown. However, centering provides an advantage when drilling the inner and outer holes at the same time.

More particularly, the centering operation includes centering the drilling tool 100 in a vicinity of a center 101 of the respective dimple 24. One exemplary drilling tool is a laser 100 configured to form the impingement cooling holes 33 by laser machining. Another exemplary drilling tool 100 is an electrical discharge machining apparatus 100. Another exemplary drilling tool 100 is an electron beam (EBEAM) machining apparatus 100 configured to direct an electron beam at the dimple 24 on the inner portion 14 of the wall 12. More particularly, the EBEAM machining apparatus 100 is configured to generate and focus an electron beam and to remove material by vaporization. Very small holes (on the order of a few nanometers, where desired) can be drilled using an EBEAM machining apparatus 100.

Figure 11:
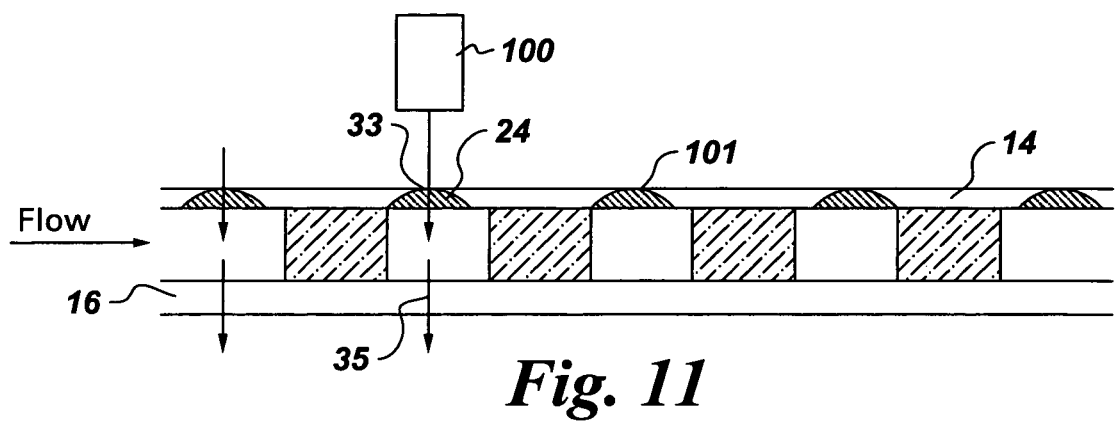
FIG. 11 illustrates a method for forming cooling holes in a component having a mesh cooling and dimple arrangement.

According to a particular embodiment, which is also illustrated by FIG. 11, the drilling operation further includes drilling a number of cooling holes 35 in the outer portion 16 of the wall 12 using the drilling tool 100. Beneficially, each of the cooling holes 35 can be drilled at the same time as the respective impingement cooling hole 33. Accordingly, each of the cooling holes 35 is aligned with a respective one of the impingement cooling holes 33, as indicated in FIG. 11. As shown for example in FIG. 9, the method may further include coating the wall 12 after performing the drilling operations to form a coating 34 on the outer portion 16 of the wall. According to a more particular embodiment, the coating step includes forming a thermal barrier coating (TBC) 34 on the outer portion 16 of the wall 12. Thermal barrier coatings 34 can be formed using known techniques, which include vacuum physical vapor deposition, air physical vapor deposition, air plasma spray, and vacuum plasma spray. Exemplary TBCs are discussed, for example, in commonly assigned, U.S. Pat. No. 6,599,568, Ching-Pang Lee et al, entitled "Method for cooling engine components using multi-layer barrier coating" and U.S. Pat. No. 6,617,003, Ching-Pang Lee et al., entitled "Directly cooled thermal barrier coating system."

Figure 12:
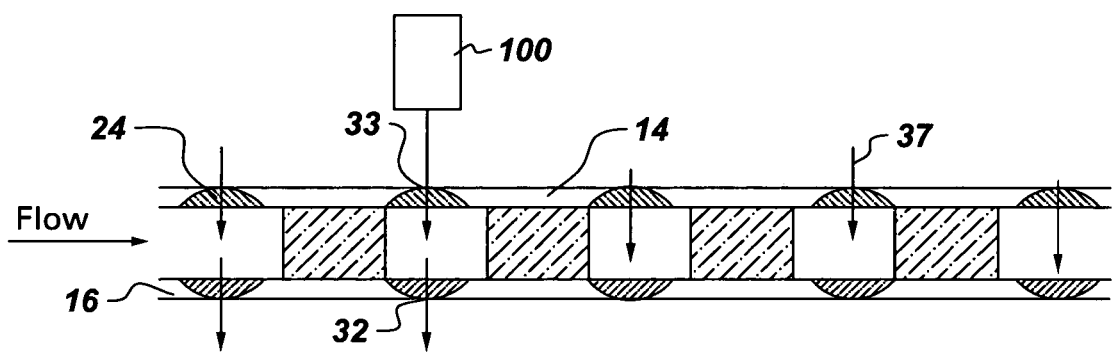
FIG. 12 illustrates the method of FIG. 11 for forming cooling holes in a component with another mesh cooling and dimple arrangement.

For the exemplary embodiment of FIG. 12, the outer portion 16 of the wall 12 defines a number of dimples 24, and the dimples 24 in the inner and outer portions 14, 16 of the wall 12 are aligned. As indicated in FIG. 12, the drilling operation further includes drilling a number of transpiration cooling holes 32 in the outer portion 16 of the wall 12 using the drilling tool 100. As indicated in FIG. 12, the transpiration cooling holes 32 are formed through the dimples 24 in the outer portion 16 of the wall 12. Each of the transpiration cooling holes 32 can be drilled at the same time as the respective impingement cooling hole 33, and consequently the transpiration cooling holes 32 are aligned with the respective impingement cooling holes 33, as indicated in FIG. 12. As shown for example in FIG. 10, the method may further include coating the wall 12 after performing the drilling operations to form a coating 34, such as a TBC, on the outer portion 16 of the wall 12.

Figure 13:
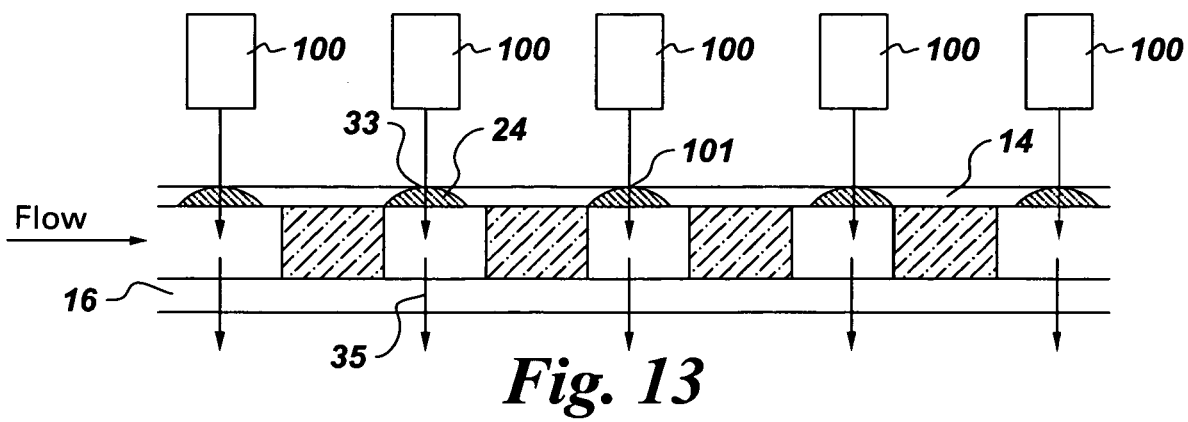
FIG. 13 illustrates another method for forming cooling holes in a component having a mesh cooling and dimple arrangement.
Figure 14:
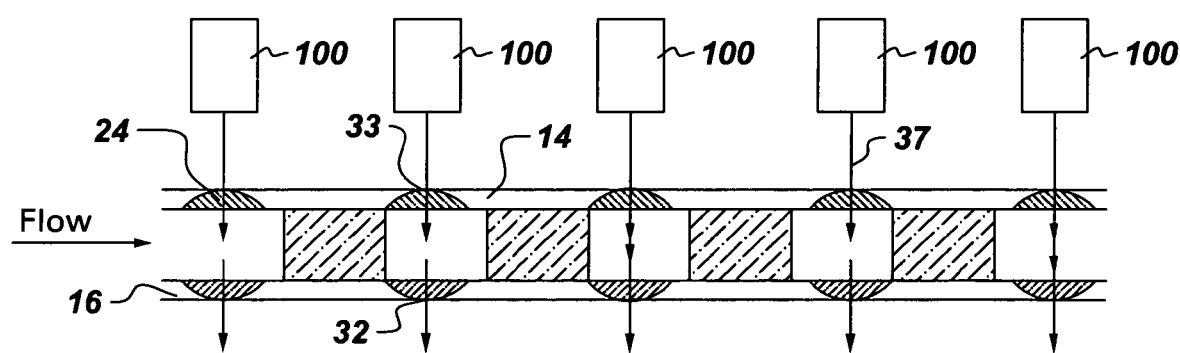
FIG. 14 illustrates the method of FIG. 13 for forming cooling holes in a component with another mesh cooling and dimple arrangement.

Another method embodiment of the invention for forming a number of cooling holes 33 in a component 10 is described with reference to FIGS. 13 and 14. As indicated, the component 10 includes at least one wall 12 having an inner portion 14 and an outer portion 16, and the inner portion 14 of the wall 12 defines a number of dimples 24. As shown for example in FIG. 13, the method includes centering a number of drilling tools 100 on respective ones of the dimples 24, and drilling a number of impingement cooling holes 33 through the inner portion 14 of the wall 12 at the dimples 12 using the respective drilling tools 100. As noted above, exemplary drilling tools 100 include a laser, an electrical discharge apparatus, and an EBEAM machining apparatus. For the exemplary embodiment of FIG. 13, the drilling operation also includes drilling a number of cooling holes 35 in the outer portion 16 of the wall 12 using the drilling tools 100. As shown, each of the cooling holes 35 is aligned with a respective one of the impingement cooling holes 33. For the exemplary embodiment of FIG. 14, the outer portion 16 of the wall 12 defines a number of dimples 24. As shown, the dimples 24 in the inner and outer portions 14, 16 of the wall 12 are aligned. For the exemplary embodiment of FIG. 14, the drilling operation also includes forming a number of transpiration cooling holes 32 by drilling through the outer portion 16 of the wall 12 with the drilling tools 100 at the dimples 24.

By combining different cooling elements (namely mesh cooling, dimples, and cooling holes), synergies are created, which enhance heat transfer. This improved heat transfer, in turn, allows weight reduction for the component 10 by lowering the pin density required to achieve similar heat transfer, due to the enhancements provided by the dimples 24 and cooling holes 32, 33, 35. Also, the use of multiple cooling elements provides greater flexibility for adjusting local cooling. The use of multiple cooling elements also provides more balanced pressure losses. The combined cooling elements are particularly effective for cooling gas turbine airfoils, and are especially beneficial for high-pressure blading.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A component comprising:
    at least one wall having an inner portion and an outer portion; and
    a plurality of pins extending between said inner and outer portions of said wall, wherein said pins define a mesh cooling arrangement comprising a plurality of flow channels,
    wherein said inner portion of said wall defines a plurality of dimples, wherein at least one of said dimples extends through said inner portion of said wall to form an impingement cooling hole, and wherein at least one of said dimples does not extend through said inner portion of said wall.

2. The component of claim 1,
    wherein said flow channels comprise a first set of flow channels substantially parallel to one another and a second set of flow channels extending substantially parallel to one another,
    wherein said first and second sets of flow channels intersect one another at a plurality of intersection points to form said mesh cooling arrangement, and
    wherein at least one of said dimples is positioned at a respective one of the intersection points.

3. The component of claim 2, wherein a majority of said dimples are positioned at respective intersection points.

4. The component of claim 1, wherein at least one of said dimples is positioned between a respective pair of said pins.

5. The component of claim 4, wherein a majority of said dimples are positioned between respective pairs of said pins.

6. The component of claim 1 wherein said outer portion of said wall defines a plurality of cooling holes.

7. The component of claim 6, wherein each of said cooling holes is aligned with a respective one of said dimples.

8. The component of claim 6, wherein each of said cooling holes has a diameter in a range of about 0.004 to about 0.060 inches.

9. The component of claim 1, wherein said outer portion of said wall defines a plurality of dimples.

10. The component of claim 9, further comprising at least one coating on said outer portion of said wall.

11. The component of claim 10, wherein said coating comprises a thermal barrier coating.

12. The component of claim 10, wherein at least one of said dimples extends through said outer portion of said wall to form a transpiration cooling hole, and wherein said coating at least partially covers said transpiration cooling hole.

13. The component of claim 1, wherein each of said dimples has a center depth in a range of about 0.010 to about 0.050 inches and a surface diameter in a range of about 0.010 to about 0.12 inches.

14. A hot gas path component comprising:
    at least one wall having an inner portion and an outer portion; and
    a plurality of pins extending between said inner and outer portions of said wall, wherein said pins define a mesh cooling arrangement comprising a plurality of flow channels, wherein said flow channels comprise a first set of flow channels substantially parallel to one another and a second set of flow channels extending substantially parallel to one another, wherein said first and second sets of flow channels intersect one another at a plurality of intersection points to form said mesh cooling arrangement,
    wherein said inner portion of said wall defines a plurality of dimples, wherein at least one of said dimples is positioned at a respective one of the intersection points, and wherein each of said dimples extend through said inner portion of said wall forming a plurality of impingement cooling holes.

15. The hot gas path component of claim 14, wherein said outer portion of said wall defines a plurality of cooling holes.

16. The hot gas path component of claim 15, wherein each of said cooling holes is aligned with a respective one of said dimples.

17. A hot gas path component comprising:
    at least one wall having an inner portion and an outer portion;
    a plurality of pins extending between said inner and outer portions of said wall, wherein said pins define a mesh cooling arrangement comprising a plurality of flow channels, wherein said flow channels comprise a first set of flow channels substantially parallel to one another and a second set of flow channels extending substantially parallel to one another, wherein said first and second sets of flow channels intersect one another at a plurality of intersection points to form said mesh cooling arrangement; and
    at least one coating on said outer portion of said wall,
    wherein said inner portion of said wall defines a plurality of dimples, wherein at least one of said dimples extends through said inner portion of said wall to form an impingement cooling hole,
    wherein said outer portion of said wall defines a plurality of dimples, and
    wherein at least one of said dimples extends through said outer portion of said wall to form a transpiration cooling hole, and wherein said coating at least partially covers said transpiration cooling hole.

18. A method for forming a plurality of cooling holes in a component, the component comprising at least one wall having an inner portion and an outer portion, wherein the inner portion of the wall defines a plurality of dimples, said method comprising:
    centering a drilling tool on one of the dimples;
    drilling at least one impingement cooling hole through the inner portion of the wall at the dimple using the drilling tool; and
    repeating said centering and drilling steps for a plurality of dimples to drill a plurality of impingement cooling holes in the inner portion of the wall.

19. The method of claim 18, wherein said centering includes centering the drilling tool in a vicinity of a center of the respective one of the dimples.

20. The method of claim 18, wherein said drilling tool comprises a laser, and wherein said drilling comprises laser machining.

21. The method of claim 18, wherein said drilling tool comprises an electrical discharge machining apparatus.

22. The method of claim 18, wherein said drilling tool comprises an electron beam (EBEAM) machining apparatus, wherein said drilling comprises directing an electron beam on the inner portion of the wall at the dimple.

23. The method of claim 18, wherein said drilling further comprises drilling a plurality of cooling holes in the outer portion of the wall using the drilling tool, wherein each of the cooling holes is aligned with a respective one of the impingement cooling holes.

24. The method of claim 23, further comprising coating the wall after performing said drilling to form a coating on the outer portion of the wall.

25. The method of claim 24, wherein said coating comprises forming a thermal barrier coating on the outer portion of the wall.

26. The method of claim 23, wherein the outer portion of the wall defines a plurality of dimples, wherein the dimples in the inner and outer portions of the wall are aligned, and wherein each of the cooling holes is a transpiration cooling hole formed through a respective one of the dimples in the outer portion of the wall.

27. The method of claim 26, further comprising coating the wall after performing said drilling to form a coating on the outer portion of the wall.

28. The method of claim 18, wherein the component is a hot gas path component.

29. A method for forming a plurality of cooling holes in a component, the component comprising at least one wall having an inner portion and an outer portion, wherein the inner portion of the wall defines a plurality of dimples, said method comprising:

centering a plurality of drilling tools on respective ones of the dimples; and drilling a plurality of impingement cooling holes through the inner portion of the wall at the dimples using the drilling tools.

30. The method of claim 29, wherein the drilling tools are selected from the group consisting of a laser, an electrical discharge machining apparatus, an electron beam machining apparatus and combinations thereof.

31. The method of claim 29, wherein said drilling further comprises drilling a plurality of cooling holes in the outer portion of the wall using the drilling tools, wherein each of the cooling holes is aligned with a respective one of the impingement cooling holes.

32. The method of claim 29, wherein the outer portion of the wall defines a plurality of dimples, wherein the dimples in the inner and outer portions of the wall are aligned, and wherein each of the cooling holes is a transpiration cooling hole formed through a respective one of the dimples in the outer portion of the wall.

\* \* \* \* \*